United States Patent [19]
Kernick et al.

[11] 3,715,648
[45] Feb. 6, 1973

[54] TECHNIQUE FOR USE OF CONTROLLED CURRENT FEEDBACK TRANSFORMERS IN POWER INVERTER APPARATUS

[75] Inventors: Andress Kernick, Murrysville, Pa.; Glenn W. Ernsberger, Worthington, Ohio; John F. Vonderembse; Manvel A. Geyer, both of Lima, Ohio

[73] Assignee: Westinghouse Electric Corporation, Pittsburgh, Pa.

[22] Filed: Feb. 1, 1972

[21] Appl. No.: 222,522

[52] U.S. Cl. .................................. 321/11, 321/45 R
[51] Int. Cl. ........................... H02m 1/18, H02m 7/52
[58] Field of Search ........... 321/11, 45 R; 307/252 M

[56] References Cited

UNITED STATES PATENTS

| | | | |
|---|---|---|---|
| 3,412,316 | 11/1968 | Kernick | 321/45 R |
| 3,490,027 | 1/1970 | Galetto et al. | 321/11 X |
| 3,588,669 | 6/1971 | Wellford et al. | 321/45 R |

Primary Examiner—William H. Beha, Jr.
Attorney—F. H. Henson et al.

[57] ABSTRACT

A technique for improving the interlock operation of a power inverter apparatus including a power stage operatively coupled to a steering stage by a controlled current feedback transformer (CCFT). Each of the stages includes a pair of switching devices and the alternate conduction of the switching devices controls the conductive state of the switching devices of the power stage. An interlock circuit operatively coupled between the power stage and steering stage controls the conductive states of the switching devices of the steering stage in response to current flow in the switching devices of the power stage. A residual bias circuit is operatively connected to the steering stage to maintain the switching devices in a conductive state for a period of time to assure effective interlock circuit operation. A non-linear energy absorbing device, such as a transformer is positioned intermediate to said CCFT and said interlock circuit to absorb erroneous currents produced by stored energy in the core of the CCFT.

4 Claims, 1 Drawing Figure

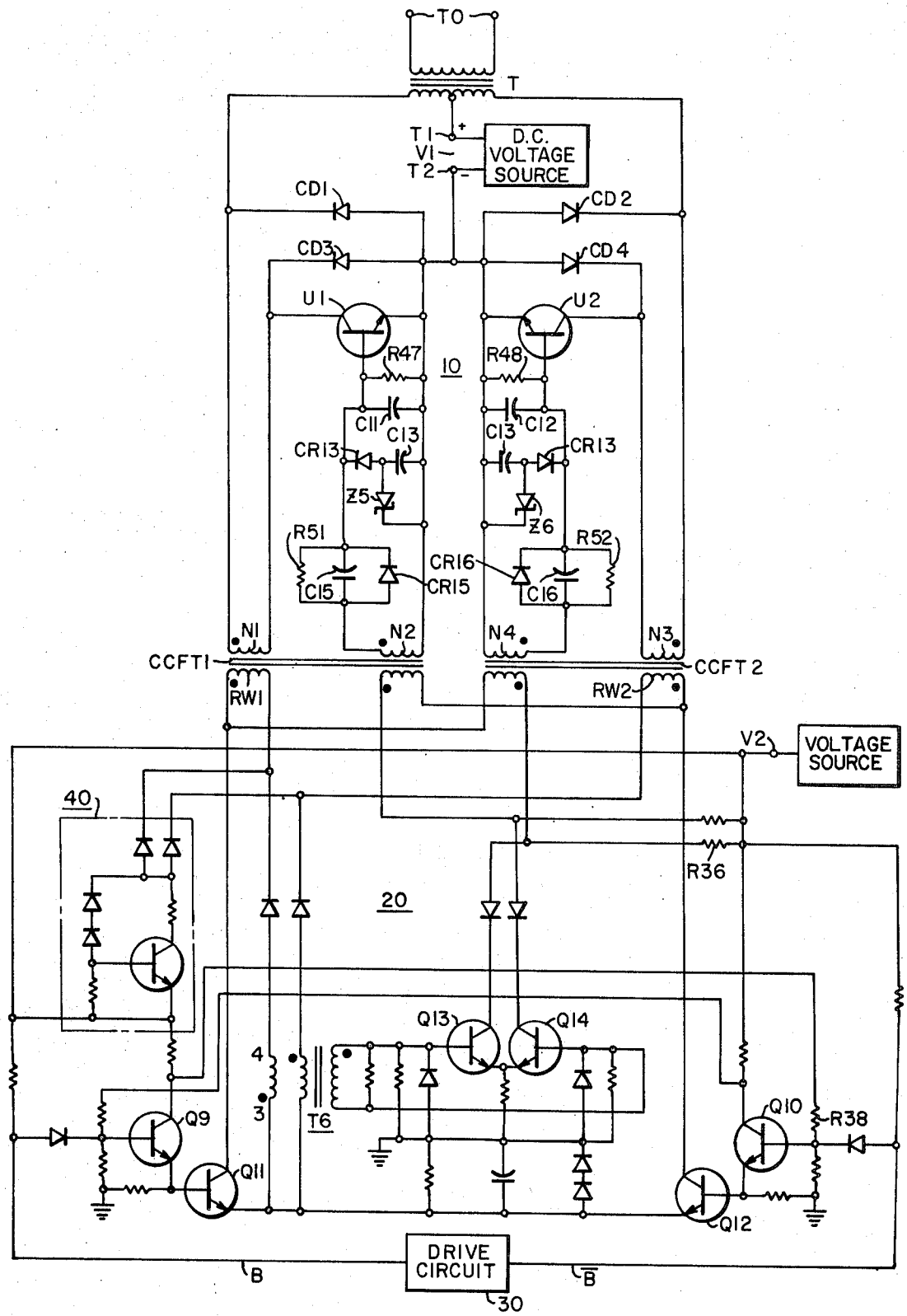

TECHNIQUE FOR USE OF CONTROLLED CURRENT FEEDBACK TRANSFORMERS IN POWER INVERTER APPARATUS

BACKGROUND OF THE INVENTION

The use of controlled current feedback transformer base drive techniques for controlling the conduction of power switches in inverter circuits through the operation of the steering circuit is described in detail in U.S. Pat. No. 3,412,316 issued Nov. 19, 1968 and entitled, "Control Circuitry for Power Inverter Apparatus".

Numerous applications of the controlled current feedback transformer base drive technique have placed high frequency demands on the steering circuit which in turn has resulted in several undesirable operational characteristics.

The magnetic core characteristics of the control current feedback transformer (CCFT) are such that delays occur in the electrical interlock function which disrupt the monitoring of the conductive state of the power switching devices in the inverter circuit. This intolerable delay can be traced to domain reorientation in the magnetic core of the CCFT and is manifested by a false indication of the collector fall current of the power switching devices. The domain change is often referred to as Barkhausen effect. The Barkhausen effect is discussed on pp. 524–532 of Ferromagnetism by R. M. Bozorth published in 1951 by D. Van Nostrand Co., Inc. The inability to clearly monitor the collector fall current of the OFF-going power switching device can result in an over-dwell of the electrical interlock causing excessive delay in initiating condition of the ON-going switching device.

Prior art techniques for providing desirable electrical interlock have involved overlapping operation of steering transistors in the steering circuit but have relied upon the circuit component characteristics, i.e., transistor-switch storage time or some fixed time delay, rather than a feedback control circuit for providing the overlap operation of the steering transistors. The prior art techniques, which require close control of the characteristics of the circuit components for proper operation has proven to result in higher component cost and loss of production time.

SUMMARY OF THE INVENTION

The invention comprises the use of steering transistors in an established controlled-current-feed-back-transformer (CCFT) base-drive scheme as taught in U.S. Pat. No. 3,412,316 where the following two improvements are incorporated to adapt the teachings of U.S. Pat. No. 3,412,316 to inverter design concepts with high frequency demands: (1) a flip-flop circuit is used to control the steering transistors to produce ON before OFF mode of operation so that both steering transistors cannot be "off" simultaneously; (2) the excitation characteristic of a coupling transformer functioning as a non-linear energy absorber is used to negate extraneous signals falsely indicative of collector fall current, which the CCFT magnetic core inadvertently (at high frequency) presents to the electrical interlock circuit.

It is an object of this invention to provide electrical interlock operation of power switching devices of a high frequency inverter wherein simultaneous conduction of the power switches is prevented without experiencing undue delay in ON-OFF switching of the power switches.

DESCRIPTION OF THE DRAWINGS

The invention will become more readily apparent from the following exemplary description in connection with the accompanying schematic drawing.

DESCRIPTION OF THE PREFERRED EMBODIMENT

Referring to the drawing there is shown an inverter apparatus including a power stage 10 having power transistors U1 and U2 contained therein; a steering circuit 20 including a flip-flop circuit comprised of transistors Q9 and Q10 which respond to the alternate output drive signals B and $\bar{B}$ of opposition polarity from drive circuit 30 to control the conductive state of steering transistors Q11 and Q12, and an electrical interlock circuit comprised of transistors Q13 and Q14 which are controlled by pulse transformer T6 to provide threshold sensing of power transistor collector current reflected through controlled current feedback transformers CCFT1 and CCFT2. The transformers CCFT1 and CCFT2 couple the steering stage 20 to the power stage 10 and output transformer T couples the power stage 10 to the output load terminals To, from which the alternating output of the inverter apparatus is taken.

Assume that power transistor U1 is conducting. A current path is provided from a center tap terminal T1 and the positive terminal of a direct current voltage source V1, through the primary windings of the power transformer T, a feedback winding N1 and the collector-emitter circuit of transistor Q11, to a terminal T2 which is connected at the negative end of the DC voltage source V1. The base drive for the power transistor U1 is supplied by current transformer positive feedback through the use of feedback windings N1 and the base drive winding N2. The winding N2 has its dotted end connected to the base electrode of the power transistor U1 and its undotted end connected to the emitter of the power transistor U1. The undotted end of the feedback winding N1 is coupled to the collector electrode of the transistor U1 and the dotted end of the winding N2 being connected to the base thereof. This arrangement provides the proper polarity drive voltage for the transistor U1 in response to the conduction of the power transistor U1. During conduction of the power transistor U1 the steering transistor Q12 is also rendered conductive in response to the base drive from the emitter circuit of the flip-flop transistor Q10.

The power transistor U2 has its emitter electrode connected to the emitter electrode of the power transistor U1 and has its collector electrode coupled through a feedback winding N3 to the power transformer T. A base drive winding N4 is coupled between the emitter of the power transistor U2 and through the threshold-drop rectifier CR16 back to the base thereof. Capacitor C16 stores the voltage drop that is used per the teachings of U.S. Pat. No. 3,412,316 for basic reverse-biasing of power transistor U2. Coupled between the dot end of the winding N4 and the base of power transistor U2 is a parallel arrangement of control rectifier CR16, capacitor C16 and resistor R52. Thus, during the time under consideration, the power transistor U2 is blocking the supply voltage as well as the voltage induced in the non-conducting half of primary winding of the power transformer T. Also during this time interval the power transistor U2 is reversed biased by a voltage equal in magnitude to the forward drop of rectifier CR16 plus the induced voltage which results from the resetting of the CCFT2 magnetic core under the influence of the constant current source 40.

The constant current source 40 functions to (a) establish a current reference on threshold which determines the on time of the interlock circuit transistors Q13 and Q14 by negating the effect of a predetermined amount of current developed in reset windings RW1 and RW2 by windings N1 and N3, and (b) to supply reset current to transformers CCFT1 and CCFT2 during the off period of the power transistors associated with the respective transformers to reset the respective cores.

Base drive current for the transistor U1 flows in a circuit including the emitter-base circuit of the power transistor U1, the winding N2 and the threshold-drop rectifier CR15. The flow of current through the threshold-drop rectifier CR15 is such that a biasing voltage across capacitor C15 is established. The resistor R51 is also connected directly across the rectifier CR15 and establishes base clamping for the power transistor U1 prior to start-up of the apparatus. The threshold-drop rectifiers CR15 and CR16, the capacitors C15 and C16, and the resistors R51 and R52 form biasing networks for developing reverse bias voltage which is used in the turning off of the respective power transistors U1 and U2. The basic operation of the steering circuit coupled through control current feedback transformers to the power stage thus described is defined in detail in the above-noted U.S. Pat. No. 3,412,316.

Conduction of power transistor U1 is controlled by the conductive state of steering transistor Q11 which in turn is controlled by the conductive state of flip-flop transistor Q9. A similar sequence of operation exists for flip-flop transistor Q10, steering transistor Q12 and power transistor U2. The ON-OFF conductive states of the flip-flop transistors Q9 and Q10 is controlled by the B and $\bar{B}$ outputs of the drive circuit 30. A typical implementation and description of operation of a drive circuit adaptable to the embodiment is disclosed in pending U.S. patent application Serial No. 14,314 filed Feb. 26, 1970 and U.S. Pat. No. 3,305,761 issued Feb. 21, 1967. In describing the operation of the flip-flop transistors Q9 and Q10 in conjunction with the steering transistors Q11 and Q12 it is noted that termination of the base drive signal provided by drive circuit 30 to flip-flop transistor Q10 does not immediately terminate conduction of the flip-flop transistor Q10 due to the blocking effect of rectifier CR18 which permits resistor R38 to continue to furnish base drive to transistor Q10 for a brief period of time. The residual base drive signal provided by rectifier CR18 and resistor R38 maintains flip-flop transistor Q10 in a conductive state until drive circuit 30 produces an output which renders flip-flop transistor Q9 conductive whereupon resistor 38 can no longer furnish base drive to the flip-flop transistor Q10. This intentional overlap of conduction of the flip-flop transistors Q9 and Q10 differs significantly from the mode of operation described in the above-identified U.S. patent wherein, according to the teachings of the patent, flip-flop transistor Q10 would be turned off prior to rendering transistor Q9 conductive. The intentional overlap of the conductive states of the flip-flop transistors Q9 and Q10 assures that at no time are steering transistors Q11 and Q12 both rendered non-conductive. By maintaining at least one of the steering transistors conductive at all times, regardless of load conditions or the condition of collective current in the power transistors U1 and U2. The situation is thus avoided wherein both power transistors U1 and U2 are rendered conductive simultaneously.

The conduction of steering transistor Q11 which results from the conductive state of flip-flop transistor Q9, initiates the turn-off mechanism of power transistor U1. Turn-off of steering transistor Q12 does not result in the initiation of power transistor U2 base drive because electrical interlock transistor Q13 is given adequate time to turn on during the intentional hesitation of the flip-flop transistors and the resulting overlap of the conductive states of steering transistors Q11 and Q12. Electrical interlock transistor Q13 is driven on by means of the coupling transformer T6 in which winding 3-4 is excited through rectifier CR19, the reset winding RW1 and conductive steering transistor Q11 by the carrier sweep-out current of the base-emitter of power transistor U1 as reflected across winding N2 to the reset winding RW1. The electrical interlock transistor Q13 remains in a conductive state until the carrier sweep-out current has been terminated through the operation of the emitter-base suppression network associated with power transistor U1 comprising capacitors C11 and C13, rectifier CR13, resistor R47 and zener diode C5, and the collector current through winding N1 of the transformer CCFT1 has subsided. The operation of electrical interlock transistor +14 is similarly controlled by the equivalent components associated with it.

As the collector current subsides in power transistor U1, the representation of collector current in the reset winding RW1 (and similarly in the reset winding RW2 of transformer CCFT2 which during its period of operation reflects a like phenomenon) at high frequency, becomes erroneous due to magnetic domain problems associated with the materials currently available for use as the core of the transformer CCFT1 and CCFT2. The core characteristics result in the storage of energy in the core in the absence of excitation on the primary and this stored energy results in a signal across reset wind RW1. This RW1 erroneous current continues to flow in the reset winding even when the collector in winding N1 has subsided to zero. This erroneous current, which cannot be attributed to stored energy in the winding air-core leakage inductance, emitted by the reset winding must be identified and ignored so that the electrical interlock transistor Q13 can switch off and thus allow resistor R36 to initiate conduction of power transistor U2 in accordance with the teachings of U.S. Pat. No. 3,412,316.

The excitation characteristics of the coupling transformer T6 provides isolation of the erroneous current originating from the magnetic core of the transformer CCFT1. The conventional non-ideal magnetic characteristics of the core material of the coupling transformer T6 permits the core to serve as a non-linear energy absorbing member and absorb the erroneous current circulating through winding 3–4 non-ideal magnetic core characteristics of the transformer CCFT1. The compensation thus provided by the coupling transformer TC6 prevents undesired delay in the electrical interlock function and the control-current-feedback-transformer operation sought in U.S. Pat. No. 3,412,316 is achieved while utilizing commercially available semiconductive devices and magnetic materials.

We claim:

1. In a power inverter apparatus having a power stage including a pair of ON-OFF power switching devices operatively connected for alternately supplying the output of said power inverter apparatus, a steering circuit including a pair of ON-OFF steering switching devices, transformer means operatively coupling said power stage and said steering stage the conductive state of said steering switching devices controlling the conductive state of said power switching devices, interlock circuit means operatively connected to said steering stage for controlling the conduction of said steering switching devices in response to the conductive condition of said power switching devices and drive circuit means for generating alternate actuation output signals for alternately changing the conductive state of said steering switching devices, an OFF conductive state of one of said steering switching devices resulting in an ON conductive state of the associated power switching device, the improvement for establishing a simultaneous ON conductive state of said pair of steering switching devices for a time adequate to permit operation of said interlock circuit, said improvement comprising a residual biasing means operatively associated with said pair of steering switching devices and responding to the alternate actuation output signals of said drive circuit means by maintaining the OFF going one of said pair of steering switching devices in an ON conductive state for a period of time sufficient to establish simultaneous conduction of said pair of steering switching devices for a brief period of time sufficient to permit operation of said interlock circuit.

2. In a power inverter apparatus as claimed in claim 1 wherein said residual bias circuit means includes a transistor flip-flop circuit having a first stage including a first transistor operatively connected between said drive circuit means and one of said steering switching devices and a second stage including a second transistor operatively connected between said drive circuit means and the other of said steering switching devices, each of said stages including a resistor-blocking rectifier combination, said first and second stage responding to said alternate actuation output signals of said drive circuit means by alternately rendering said steering switching devices ON and OFF, the resistor-blocking rectifier combination of the respective flip-flop stages functioning to maintain the steering switching device associated with the respective flip-flop stages in an on conductive state following termination of the drive circuit actuation signal for a period of time sufficient to render the other of said steering switching device conductive in response to said drive circuit activating signal thereby establishing simultaneous conduction of said pair of steering switching devices.

3. In a power inverter apparatus as claimed in claim 1 wherein said interlock circuit is operatively connected between said transformer means and said steering stage to delay the turn-off of the respective steering switching devices until the current flow in the power switching device changing from an ON conductor state to an OFF conductive approximates a predetermined value, and a non-linear energy absorbing means intermediate said transformer means and said interlock circuit to absorb residual output currents developed by said transformer means following essential termination of the current flow in said power switching device thus preventing erroneous operation of said interlock circuit.

4. In a power inverter apparatus as claimed in claim 3 wherein said non-linear energy absorbing means comprises a transformer.

* * * * *